US007574973B2

(12) United States Patent
Markham

(10) Patent No.: US 7,574,973 B2
(45) Date of Patent: Aug. 18, 2009

(54) EMERGENCY RESCUE DEVICE AND METHOD

(76) Inventor: Joseph P. Markham, 12094 W. $75^{th}$ Pl., Arvada, CO (US) 80005

(*) Notice: Subject to any disclaimer, the term of this patent is extended or adjusted under 35 U.S.C. 154(b) by 0 days.

(21) Appl. No.: 11/844,867

(22) Filed: Aug. 24, 2007

(65) Prior Publication Data

US 2009/0050048 A1 Feb. 26, 2009

(51) Int. Cl.
*G01D 21/00* (2006.01)
*A63B 29/02* (2006.01)

(52) U.S. Cl. ................. 116/209; 116/201; 116/DIG. 44

(58) Field of Classification Search ................. 116/200, 116/201, 209, 210, 278, DIG. 8, DIG. 9, 116/DIG. 44; 40/212, 586, 602; 472/51, 472/54, 55, 134; 446/308–312, 475; 428/4
See application file for complete search history.

(56) References Cited

U.S. PATENT DOCUMENTS

| | | | | |
|---|---|---|---|---|
| 825,843 | A | * | 7/1906 | Kliemandt .................. 446/398 |
| 1,664,401 | A | * | 4/1928 | Craig ......................... 446/475 |
| 1,903,082 | A | * | 3/1933 | Adams ........................ 472/54 |
| 2,949,094 | A | * | 8/1960 | Clothier ...................... 116/209 |
| 3,072,372 | A | * | 1/1963 | Lowry ........................ 244/147 |
| 3,229,290 | A | * | 1/1966 | Fisher ......................... 342/12 |
| 3,291,096 | A | * | 12/1966 | Walter ...................... 116/63 R |
| 3,744,417 | A | * | 7/1973 | Kaneko ...................... 102/357 |
| 3,877,096 | A | | 4/1975 | Scesney |
| 4,080,925 | A | * | 3/1978 | Moore ........................ 116/200 |
| 4,111,407 | A | | 9/1978 | Stager |
| 4,114,561 | A | | 9/1978 | Asaro |
| 4,635,754 | A | | 1/1987 | Aschauer et al. |
| 4,696,252 | A | * | 9/1987 | Grill .......................... 116/210 |
| 4,768,739 | A | | 9/1988 | Schnee |
| 4,815,677 | A | * | 3/1989 | Rushing et al. ............... 244/33 |
| 4,850,031 | A | | 7/1989 | Allsop et al. |
| 5,421,287 | A | * | 6/1995 | Yonover ..................... 116/209 |
| 5,654,521 | A | * | 8/1997 | McDaniel ................... 102/348 |

(Continued)

FOREIGN PATENT DOCUMENTS

| | | |
|---|---|---|
| EP | 1 795 235 | 6/2007 |

OTHER PUBLICATIONS

Translation of EP 1795235 from Schreiber Translations, Inc., Dec. 2008.*

(Continued)

*Primary Examiner*—Amy Cohen Johnson
(74) *Attorney, Agent, or Firm*—Sheridan Ross P.C.

(57) ABSTRACT

An emergency rescue device and system are provided comprising a plurality of reflective emergency rescue strands. The plurality of reflective strands are housed within a canister. An activation element deploys the reflective strands away from the user in a multi-directional pattern. In the case of an avalanche victim, the reflective strands enable immediate visual identification of the general location of the victim. A rescuer may then pull on one of the exposed strands to exactly locate the victim. The reflective strands may be ejected away from the user in a number of ways to include activation of a combustible propellant, an explosive charge, or compressed source of gas integrated within the canister. Alternatively, a plurality of compressed springs within the canister may be used to eject the reflective strands, or the user may manually deploy the strands.

14 Claims, 7 Drawing Sheets

U.S. PATENT DOCUMENTS

| | | | | |
|---|---|---|---|---|
| 6,164,239 | A * | 12/2000 | Dawson | 116/210 |
| 6,167,249 | A | 12/2000 | Hereford et al. | |
| 6,220,909 | B1 | 4/2001 | Aschauer et al. | |
| 6,270,386 | B1 | 8/2001 | Visocekas | |
| 6,359,568 | B1 | 3/2002 | Johnson | |
| 6,412,482 | B1 * | 7/2002 | Rowe | 128/204.18 |
| 6,415,734 | B1 * | 7/2002 | LaPuzza | 116/201 |
| 6,484,021 | B1 | 11/2002 | Hereford et al. | |
| 6,484,662 | B1 | 11/2002 | Perucca | |
| 6,505,575 | B1 * | 1/2003 | Ciari | 116/209 |
| 2003/0094127 | A1 * | 5/2003 | Stelmach | 116/211 |
| 2006/0231012 | A1 * | 10/2006 | Wamester et al. | 116/210 |
| 2007/0056500 | A1 | 3/2007 | Forsyth | |

OTHER PUBLICATIONS

"Mylar Reflective Film Sheeting", available at http://scientificsonlline.com/product.asp?pn=3053604&sid=google&cm_mmc=google-_-cp . . . , printed Mar. 19, 2007.

International Search Report for International (PCT) Patent Application No. PCT/US2008/060614, mailed Aug. 8, 2008.

Written Opinion for International (PCT) Patent Application No. PCT/US2008/060614, mailed Aug. 8, 2008.

* cited by examiner

Fig. 4
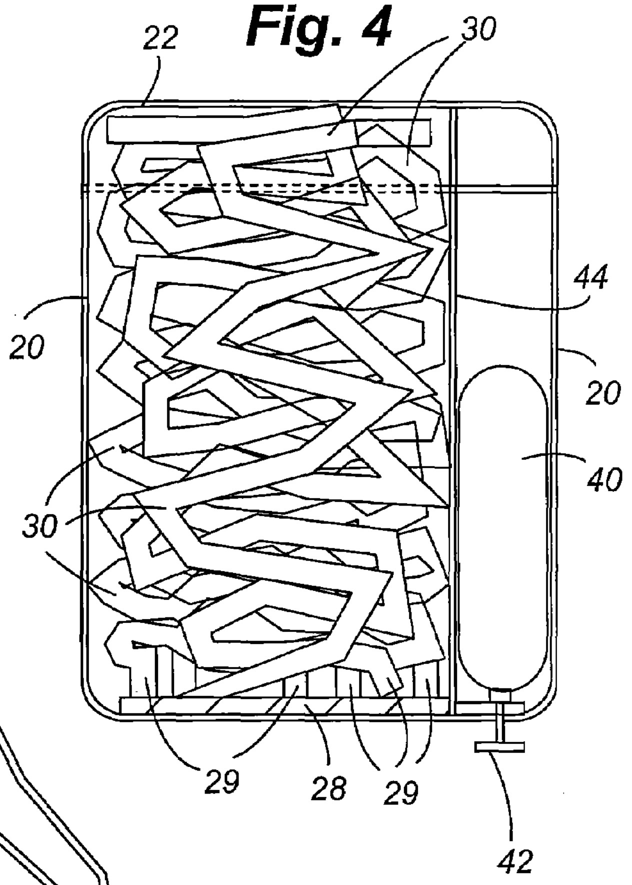
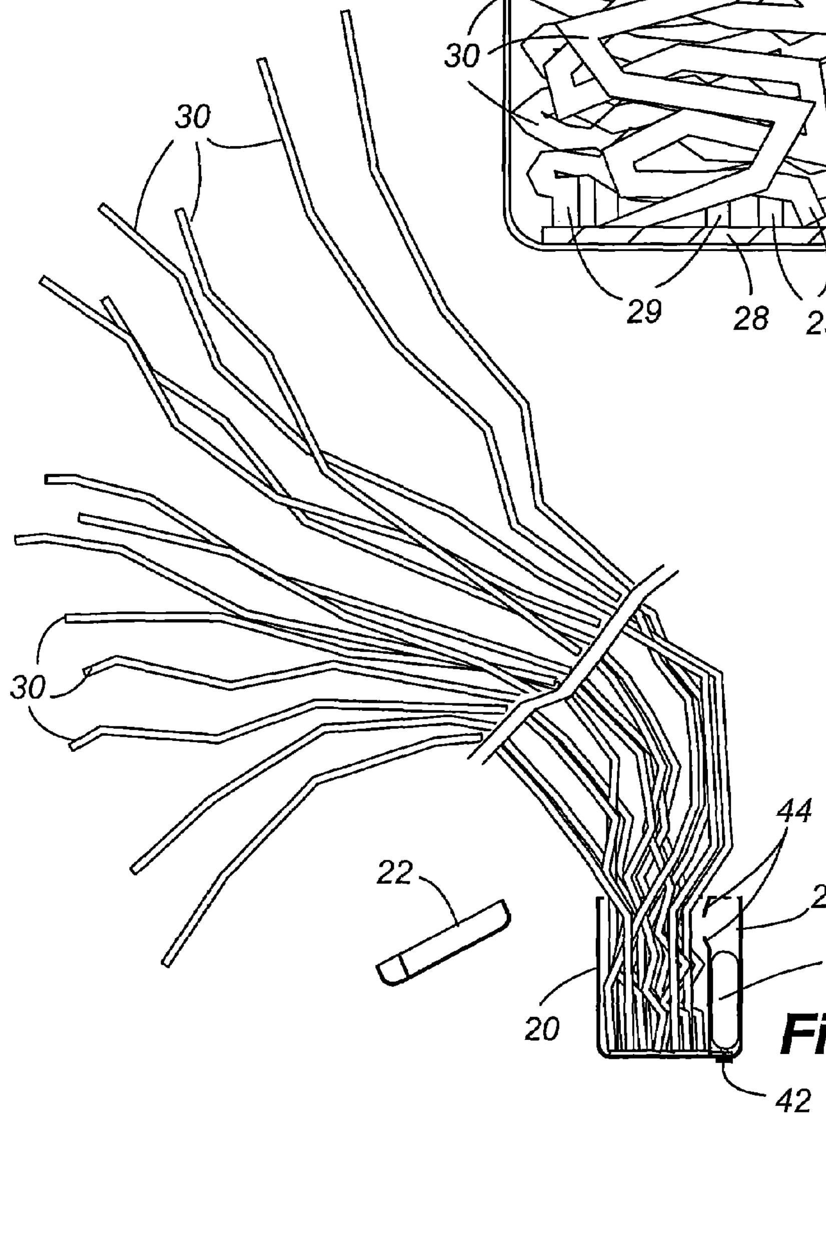
Fig. 5

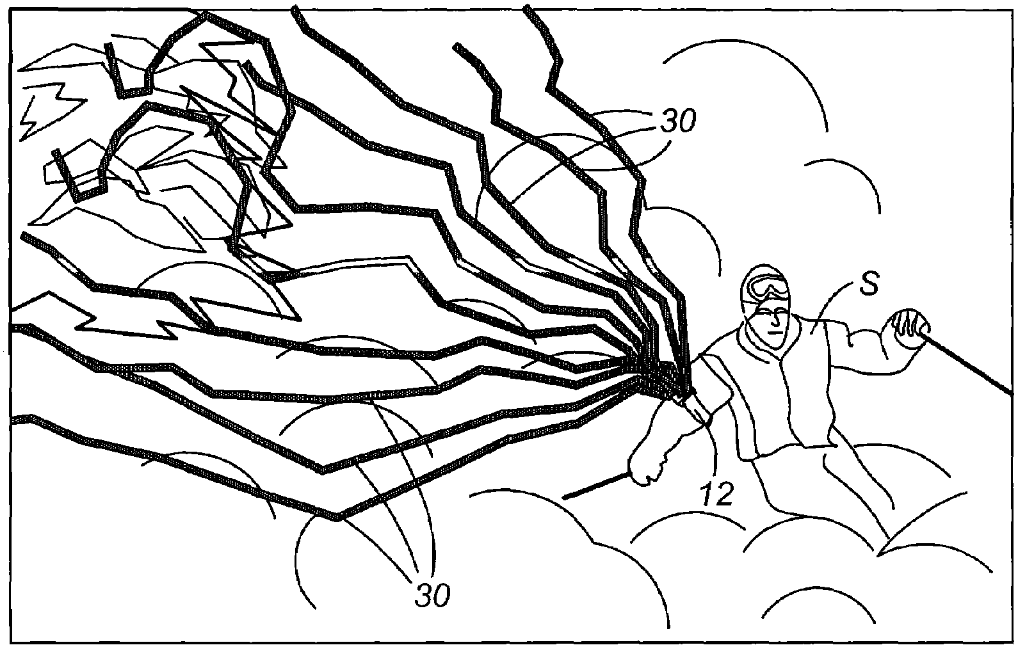
Fig. 8
Fig. 9
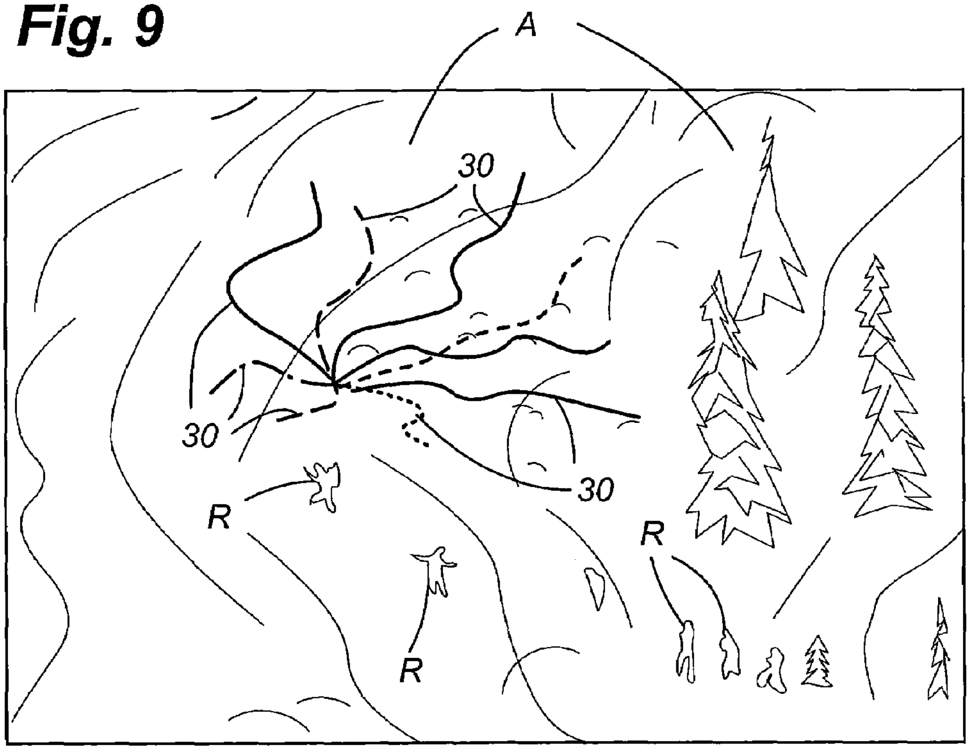

EMERGENCY RESCUE DEVICE AND METHOD

FIELD OF THE INVENTION

The present invention relates to methods and devices for locating persons in order that they may be rescued, and more particularly, to a device and method including an integrated emergency rescue line and reflective locator that serve to visually locate the area of a person to be rescued. For avalanche victims who may be buried in snow, the rescue line feature allows a rescuer to locate the exact location of the victim.

BACKGROUND OF THE INVENTION

In recent years, backcountry skiing and snowboarding has become increasingly popular. Cross-country skiing has also increased in popularity, such that there are a greater number of outdoor enthusiasts who traverse the backcountry during the winter and spring when snow covers the high country. Avalanches have always posed an extremely dangerous threat to back country enthusiasts. Unfortunately an increasing number of avalanche victims occur each year. An avalanche victim who is buried in snow can die very quickly if the avalanche victim is not rescued; suffocation coupled with cardiac arrest being one of the primary causes of death. While rescue units continue to improve in their ability to rapidly respond to an avalanche disaster, many avalanche victims cannot be saved since suffocation can occur within minutes of the avalanche.

There are a number of rescue devices in existence that are intended to provide a means to locate an avalanche victim. For example, electronic locating systems are well known and widely used for skiers, snowmobilers, and the military. One known system includes the use of a radio transceiver unit that continually operates in a transmitting mode. In the event of an avalanche, the buried victim has the transmitting unit that continues to transmit the signal. Others in the group and/or rescuers who also have the system are able to switch their units to a receiving mode and therefore attempt to locate the buried victim by observing variations in the received signal strength. This type of system has some advantages; however, because of the non-directional signal that is transmitted by the victim's unit, it is still necessary for the rescuers to first generally locate the location of the increased signal strength, and then begin a wide digging pattern in order to find the victim. The time it takes to dig in a wide area prevents timely location and extraction of the victim.

One apparatus for locating avalanche victims making use of a radio transceiver system includes the invention disclosed in U.S. Pat. No. 6,484,021. In this reference, the traditional non-directional signal is improved by the use of directional antennas that provide a rescuer with a three-dimensional vector analysis capability thereby providing a better means for locating the location of the transmitting unit.

Another type of avalanche rescue or locating device includes the invention disclosed in U.S. Pat. No. 6,270,386. In this reference, an avalanche life jacket having an airbag inflatable via a gas release system is provided. Upon actuation, the life jacket quickly inflates to surround at least the back and sides of the user's head to thereby provide physical protection around the user's head, and thereby creating at least some air space to help prevent suffocation of the user from being buried in the snow.

Another avalanche life saving system is disclosed in U.S. Pat. No. 6,220,909, which also includes an inflatable balloon design in which the inflated balloon supports and protects the user.

Yet another type of avalanche rescue system includes an avalanche rescue marker system disclosed in U.S. Pat. No. 4,114,561. This reference discloses the use of an inflatable marker or balloon secured to the user which is quickly inflated by a trigger assembly. When activated, the balloon inflates and rises into the air, thereby marking the location of the avalanche victim.

While the foregoing devices and methods may be adequate for their intended purpose, there is still a need for an avalanche victim marking and rescue system that is effective, and can easily locate the exact position of the avalanche victim such that a quick rescue can take place.

Therefore, it is one object of the present invention to provide an emergency rescue device and method wherein the person to be rescued can be easily located by visual means. It is yet another object of the present invention to provide an emergency rescue device and method wherein the exact physical location of the victim may be quickly identified by the use of a rescue line that is attached to the victim. It is another object of the present invention to provide a rescue device and method wherein the device may be activated either automatically or manually.

SUMMARY OF THE INVENTION

In a first embodiment of the present invention, the invention comprises an emergency rescue device having a canister that houses a plurality of reflective strands or ribbons. A strap is used to secure the rescue device to the user. When the device is activated, the strands are ejected away from the user in a multi-directional pattern. The strands are preferably made of a highly reflective material, such as MYLAR®, and the strands are preferably of a length such that at least some of the strands will be visible in the event the user is an avalanche victim buried in the snow. For example in a first embodiment, the strands could be approximately between 20 and 40 feet long and when the device is activated, the strands are deployed in multiple directions around the user.

In order to provide enough force to sufficiently eject the strands from the canister, a combustible propellant or an explosive charge may be used thereby providing adequate motive force to deploy the strands and spread the strands in a multi-directional pattern away from the user. A percussion cap can be used to trigger the igniting of the propellant or explosive charge.

In another embodiment of the present invention, in lieu of an explosive charge or combustible propellant, the strands may be deployed by pressurized gas emitted from a gas cylinder that holds a quantity of compressed gas.

In yet another embodiment of the present invention, the canister may include a plurality of coiled springs, and removing a lid of the canister allows the springs to expand and eject the strands in the multi-directional pattern away from the user.

In yet another embodiment of the present invention, the user may manually deploy the strands by holding distal ends of the group of strands and throwing the strands away from the user's body. In this embodiment, the distal ends of the strands may be weighted, such as by attached ball bearings. The user may selectively deploy one or all of the strands by throwing the strands away from the user's body.

With respect to avalanche victims, the reflective strands provide an immediate visual indication of the general area in which the victim can be found. Once a rescuer finds one of the strands, the rescuer may tug on the strand(s) that will directly point the rescuer to the direction in which the victim is found.

For personnel who need to be rescued, but who may not be an avalanche victim, the reflective strands create a reflective pattern that may be easily seen from aircraft, as well as rescuers on the ground.

Other features and advantages of the present invention will become apparent from a review of the following detailed description, taken in conjunction with the drawings.

BRIEF DESCRIPTION OF THE DRAWINGS

FIG. 4 is an enlarged cross section of another embodiment of the present invention;

FIG. 5 is a cross section of the embodiment of FIG. 4 after it has been activated;

FIG. 8 illustrates the device of the present invention after it has been activated, the device being worn by a skier;

FIG. 9 illustrates the device of the present invention after it has been activated in an avalanche event wherein at least some of the reflective strands remain exposed above the surface of the snow;

DETAILED DESCRIPTION

Figure 1:
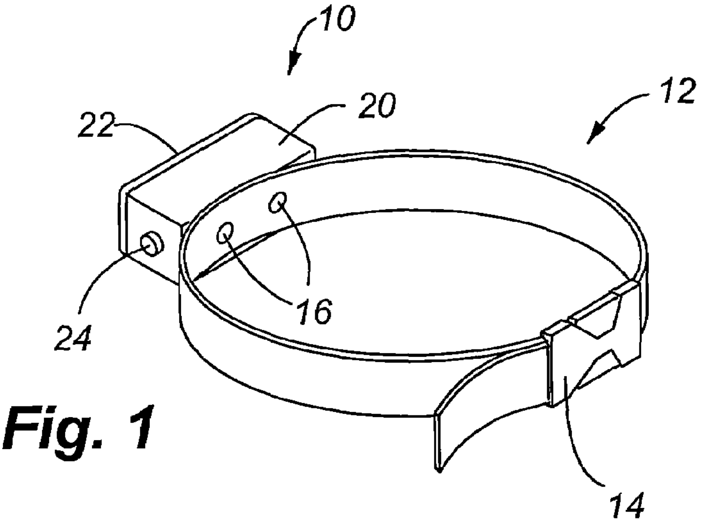
FIG. 1 is a perspective view of a first embodiment of the present invention.
Figure 2:
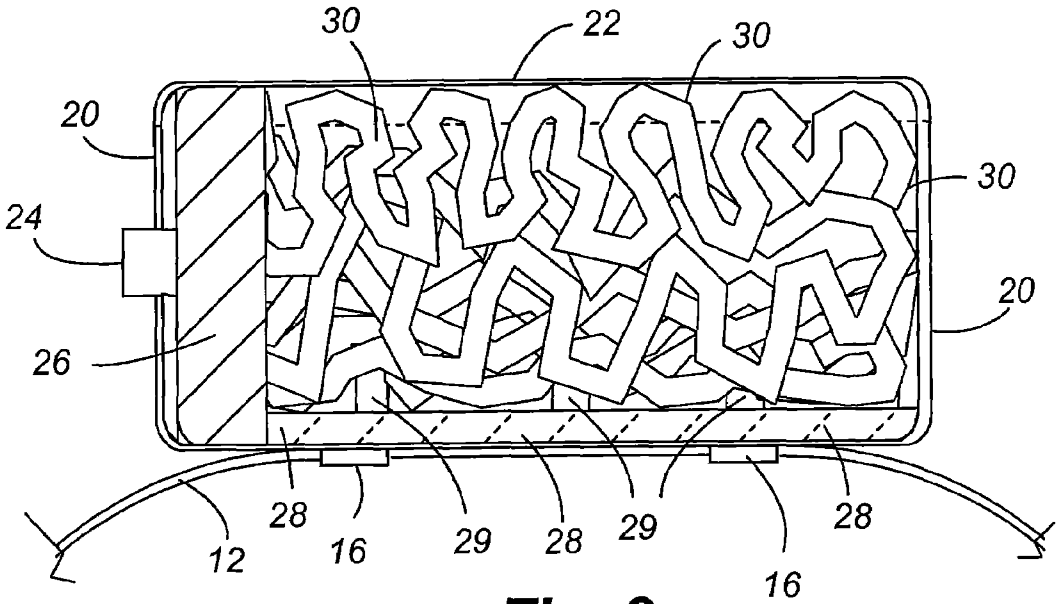
FIG. 2 is an enlarged cross section of the embodiment of FIG. 1.

FIGS. 1 and 2 illustrate an emergency rescue device 10 in accordance with a first embodiment of the present invention. The rescue device 10 may be secured to the user, such as by strap 12 and adjustable buckle 14. A pair of rivets 16 secure canister 20 to the strap 12. The rescue device may be worn by the rescuer on the upper arm, or may be secured to the user's equipment, such as a backpack worn by the user.

Figure 3:
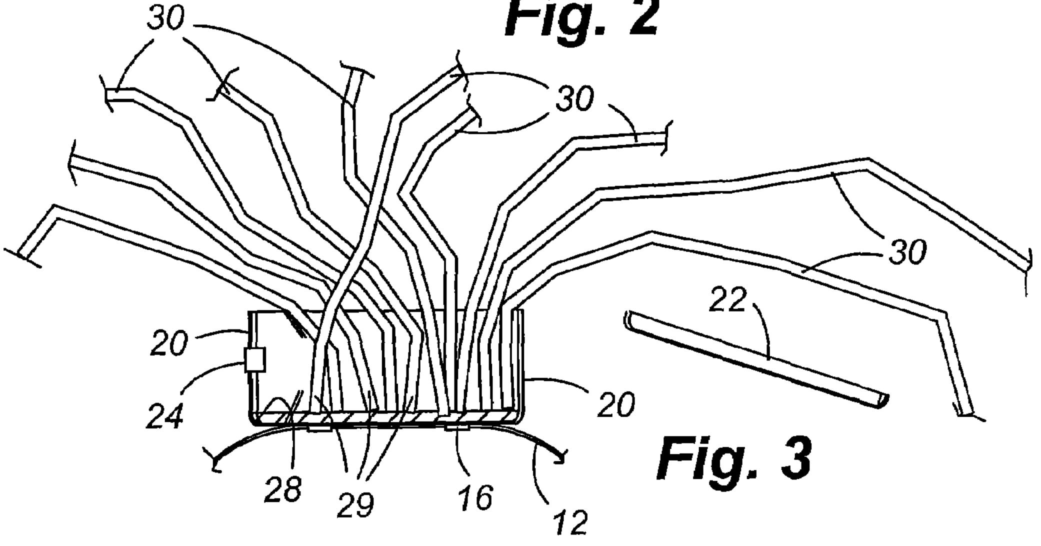
FIG. 3 is another cross section, illustrating the device after it has been activated.

The canister 20 houses a plurality of reflective strands or ribbons 30 as shown in the cross-section in FIG. 2. The strands 30 each have a proximal end 29 that is secured to a base material 28 within the canister. The base material can be, for example, a resin or glue that secures the proximal ends of the strands 30 to the bottom surface of the canister. A propellant 26 is housed in the canister and provides the motive force for ejecting the strands away from the canister. The term "propellant" as generically referred to herein is intended to cover a combustible propellant, explosive charge, compressed gas, or other means to create an over-pressure environment inside the canister thereby forcibly removing the lid 22 and ejecting the reflective strands. An activation element, such as a percussion cap 24, is provided to activate the propellant/explosive charge. Upon activation, the lid 22 as shown in FIG. 3 is blown away from the canister and the strands 30 are deployed in a multi-directional pattern away from the canister.

One particularly advantageous material that may be used for the strands 30 of the present invention includes nylon ribbon that is coated with a MYLAR ® reflective film sheeting. Alternatively, the strands may be made purely of MYLAR ® material. With respect to use of the invention for rescue of avalanche victims, it is advantageous to provide the strands in a type of material that allows rescuers to pull on the strands without breakage. Therefore, the use of a nylon and MYLAR ® combination may be suited for this particular use.

FIG. 4 illustrates another embodiment of the present invention in which the force provided to deploy the strands is a gas cylinder 40. As shown in FIG. 4, the gas cylinder 40 is disposed within the canister 20, and an activation button or plunger 42 is used to puncture a seal in the cylinder. A protective cover (not shown) may be placed over the plunger 42 to prevent inadvertent activation when the device is not in use. Once the cylinder seal has been broken, gas quickly evacuates from the cylinder, thereby creating an over-pressure within the canister, and ultimately causing the lid 22 to be blown away from the canister.

A thin rupturable wall 44 may be provided in the canister to separate the cylinder from the plurality of strands 30. Upon activation of the cylinder, the wall 44 ruptures thereby enabling the over-pressure gas to fill the canister. Alternatively, it is also contemplated that the actual cylinder 40 could rupture, thereby providing more of an explosive reaction within the canister to cause removal of the lid and deployment of the strands. As shown in FIG. 5, the strands 30 deploy in the multi-directional pattern away from the canister.

Figure 6:
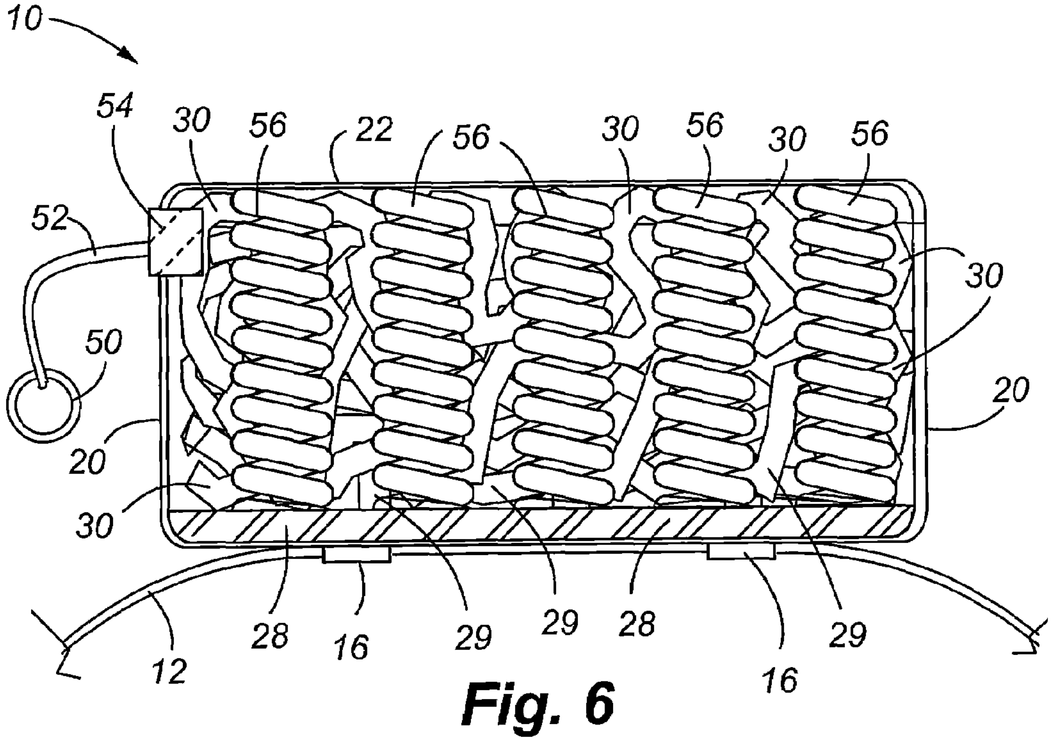
FIG. 6 is an enlarged cross section of yet another embodiment of the present invention.
Figure 7:
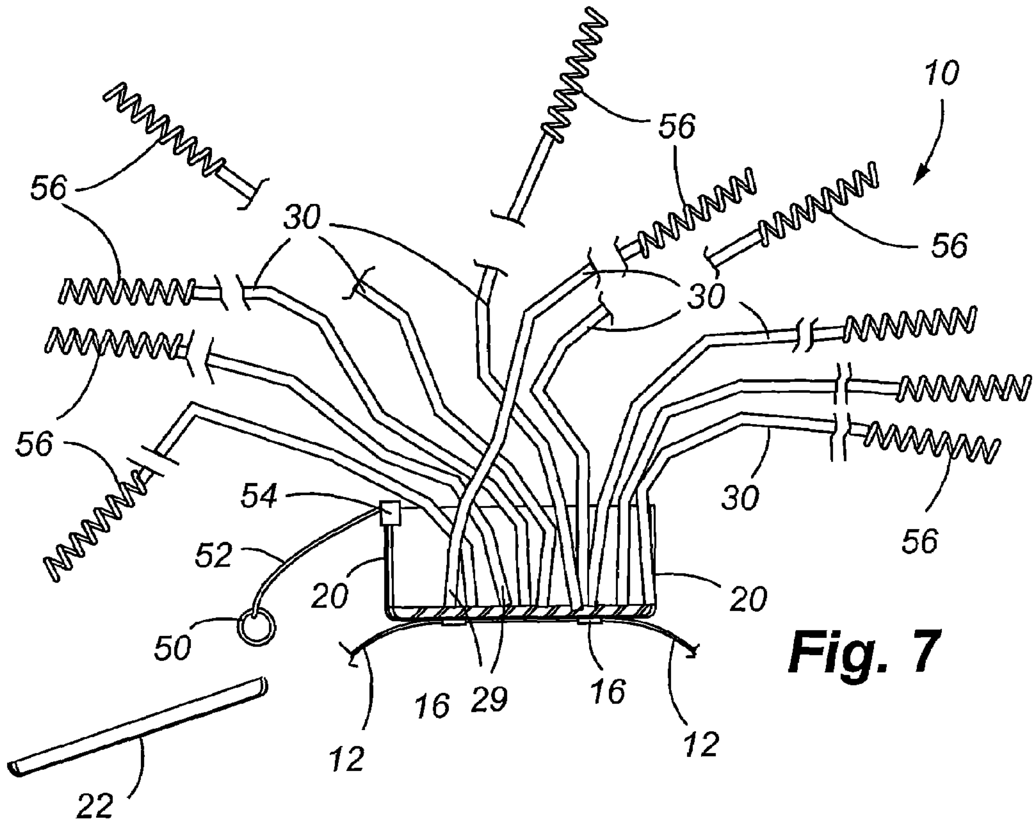
FIG. 7 is a cross sectional view of the embodiment of FIG. 6 showing it after it has been activated.

FIGS. 6 and 7 illustrate yet another embodiment of the present invention. In FIG. 6, a plurality of strands 30 and a plurality of deployment springs 56 are housed in the container. Each of the strands 30 have their proximal ends 29 secured to the base material 28. The strands have their opposite ends secured to the springs 56. A lid lock 54 is provided to keep the lid 22 attached to the canister. A user activates the device by pulling on the pull ring 50, which in turn causes the rip cord 52 to release the lid lock 54. Upon release of the lid lock, the lid 22 separates from the canister 20 and the springs 56 that are compressed with the canister expand, thereby ejecting the strands 30 from the canister in the multi-directional pattern away from the user.

FIG. 8 illustrates use of the rescue device wherein a skier S has deployed the device in response to an impending avalanche. As shown, the strands 30 have been ejected away from the skier in a multi-directional pattern.

FIG. 9 illustrates the unfortunate situation in which the skier S has been buried by the avalanche and rescuers R are on scene in an attempt to rescue the victim. As shown, a few of the strands 30 are visible on the upper surface of the avalanche area A. In order to locate the victim, a rescuer R simply grasps one of the exposed strands, and then follows the strand to the exact location of the victim. As necessary, the rescuer digs the victim from the snow that covers the victim.

Figure 10:
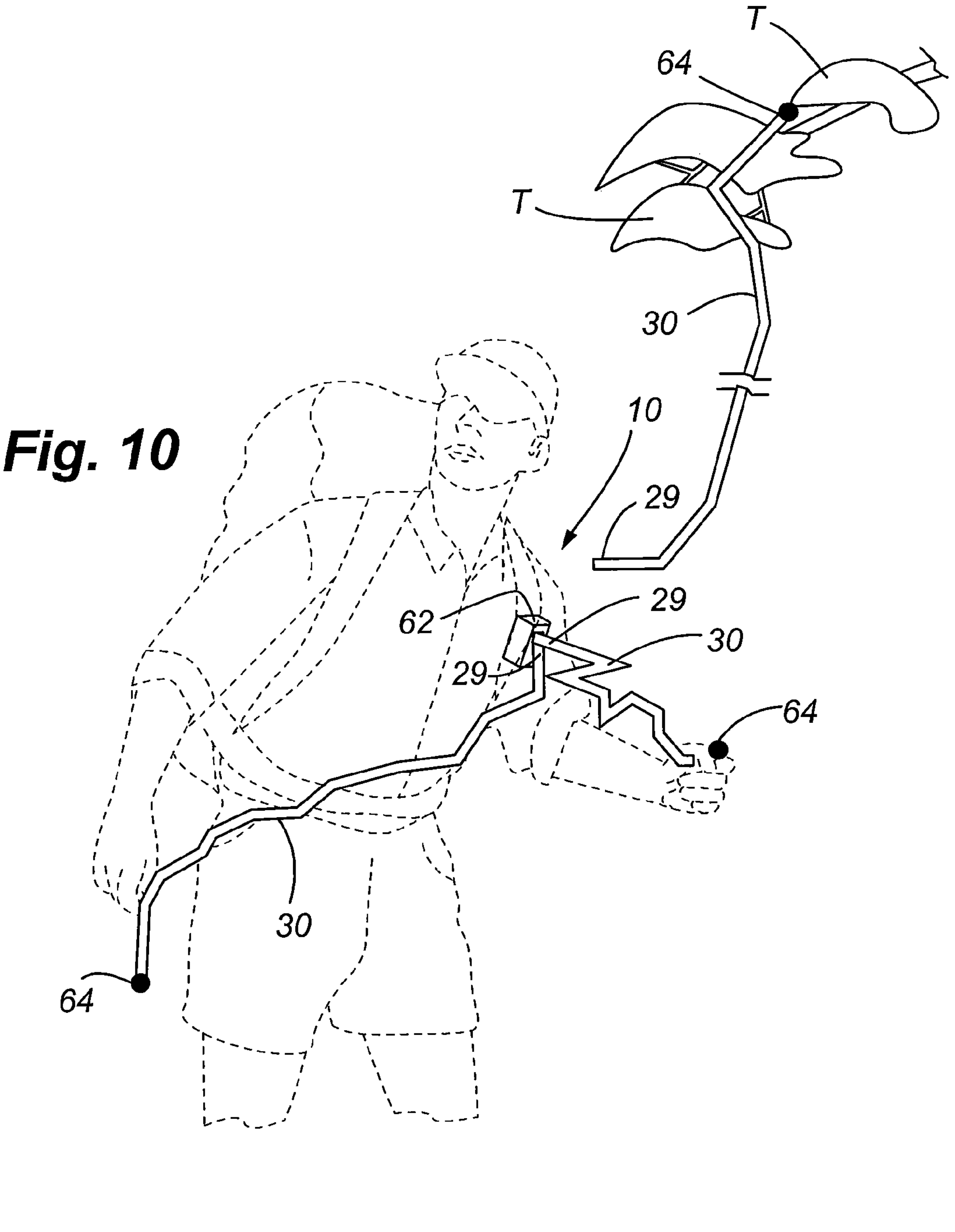
FIG. 10 illustrates yet another embodiment of the present invention that is manually activated by a user.

FIG. 10 illustrates yet another preferred embodiment of the present invention. In this embodiment, a user may manually disperse the strands 30 by throwing the strands in a desired pattern. Each of the strands has a weight 64 secured to the distal ends of the strands. The proximal ends of the strands may be secured to a base 62, and the base 62 may be secured to the user's clothing or equipment. In the example of FIG. 10 the base 62 is secured to a chest strap of the user. The user may choose to throw all, or only some of the weights 64 in order to deploy the strands away from the user. In the event the user wishes to be found, the user could selectively throw each one of the strands in a selective pattern about the user. For example, the user could attempt to throw the weighted strands so that some of the strands loop over an adjacent tree T or bush, thereby providing an exposed reflective strand that may be more easily seen by search aircraft.

After one or more of the strands have been deployed, the user then may separate the proximal end 29 from the base 62. One example of a material that can be used as the weight 64 includes appropriately sized ball bearings that can be easily grasped and thrown by the user.

Figure 11:
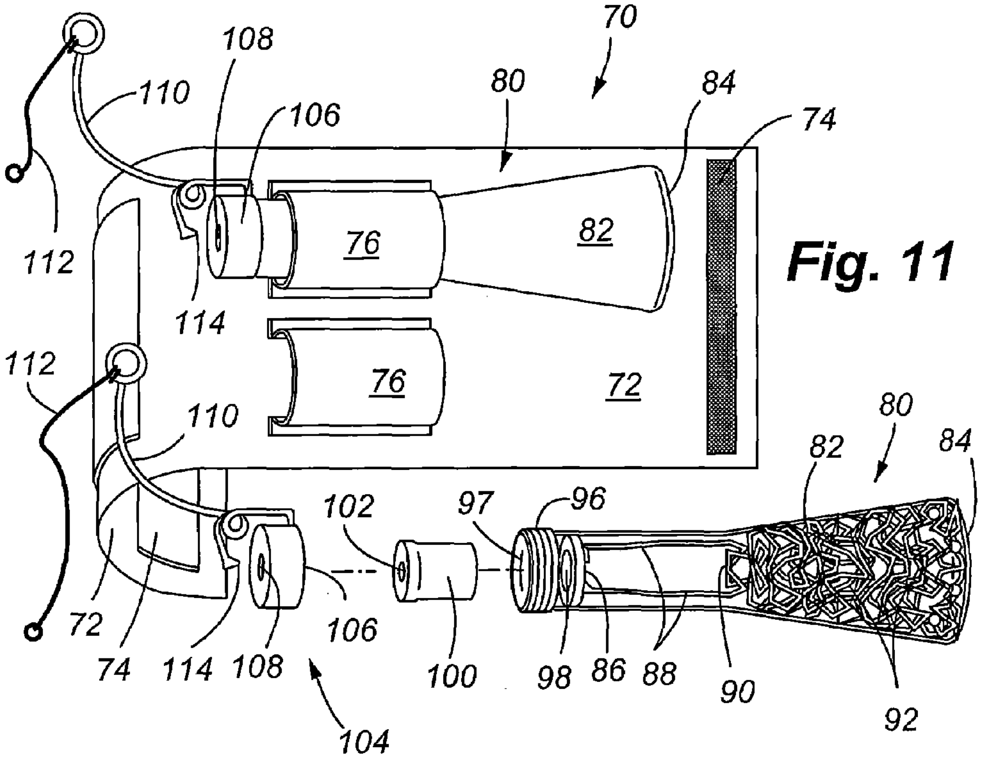
FIG. 11 illustrates another preferred embodiment of the present invention including a pair of rescue devices, one being shown mounted to an armband, and the other shown in an exploded and partial cross section.

FIG. 11 illustrates another preferred embodiment of the present invention. In FIG. 11, a pair of rescue devices 80 may be worn by the user by use of an armband 70. The armband includes a strap 72 and hook and pile material 74 at the ends of the strap enabling the user to adjust and secure the strap, such as to the user's arm. Mounting sleeves 76 are incorporated on the exposed exterior side of the armband 72 in order to receive and hold the rescue devices 80.

Figure 12:
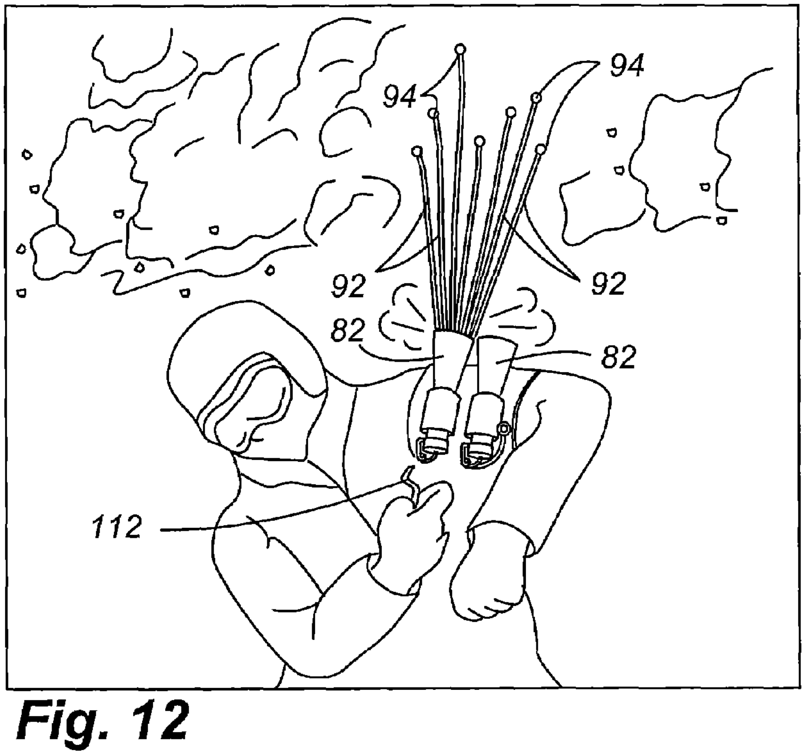
FIG. 12 illustrates the embodiment of FIG. 11 showing activation by the user.

The rescue devices 80 in this embodiment each include a canister 82 that houses a removable base 86. A plurality of retaining wires 88 are secured to the base 86, and include hooked ends 90. A plurality of reflective strands 92 each have proximal ends secured to the hooked ends 90. The reflective strands 92 are tightly packed together and are secured between the lid 84 and the hooked ends 90. End 96 of the rescue device 80 may be threaded and a central opening 97 receives an explosive cartridge 100. The explosive cartridge 100 also extends through opening 98 in the removable base 86. An activation element 104 is used to activate the explosive cartridge 100. The element 104 includes an end cap 106 that is threaded over ends 96. An opening 108 in the end cap 106 aligns with an activation cap 102 on the explosive cartridge 100. An activation arm 110 is secured to the end cap 106. A hammer 114 is positioned so that it may contact the cap 102 when the user pulls the lanyard 112 which is attached to the free end of the activation arm 110. Referring also to FIG. 12, when the user desires to activate the device, a sharp tug or pull is made on the lanyard 112 causing the hammer 114 to strike the cap 102. The cap ignites the explosive material in the cartridge. Upon activation of the explosive cartridge 100, the reflective strands 92 are ejected away from the user in the multi-directional pattern. Optionally, the distal ends of the reflective strands 92 may include weights 94 that assist in guiding and maintaining the strands in the multi-directional pattern during ejection.

Figure 13:
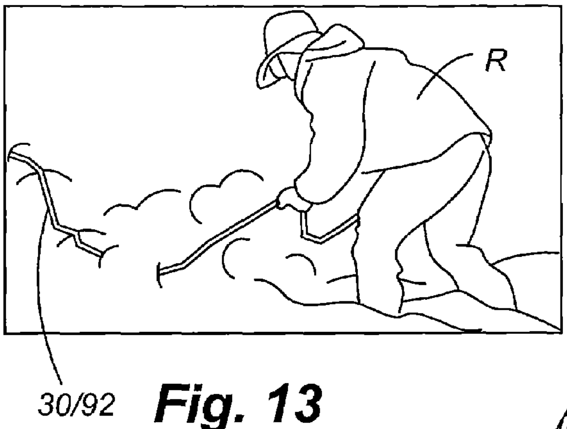
FIG. 13 illustrates a rescuer attempting to locate the victim by securing and pulling on an exposed reflective strand.

FIG. 13 illustrates a rescuer making an attempt to rescue a victim wherein one or more of the strands 30/92 have been ejected away from the user. As shown, the rescuer grasps one of the strands and then pulls the strand, thus providing the direction towards the location of the victim.

Figure 14:
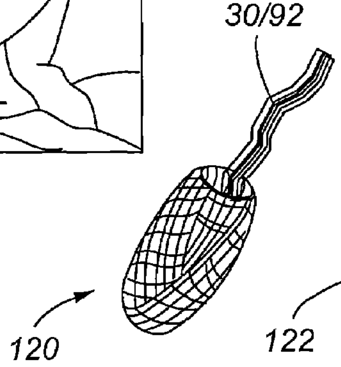
FIG. 14 illustrates a roll of reflective strand material.
Figure 15:
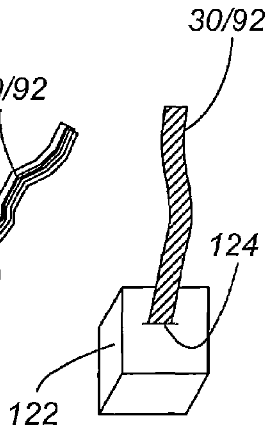
FIG. 15 illustrates a dispensing unit used to manually dispense a selected length of the reflective strand from the roll.

FIG. 14 illustrates another embodiment of the present invention in the form of a tightly wound ball 120 of reflective strand material 30/92. As shown in FIG. 15, the reflective strand may be dispensed from a dispensing unit 122. The dispensing unit 122 includes an opening allowing the free end of the material to be grasped by the user, and a cutting edge 124 placed adjacent to the opening allows the user to separate a selected length of the material to be used.

Figure 16:
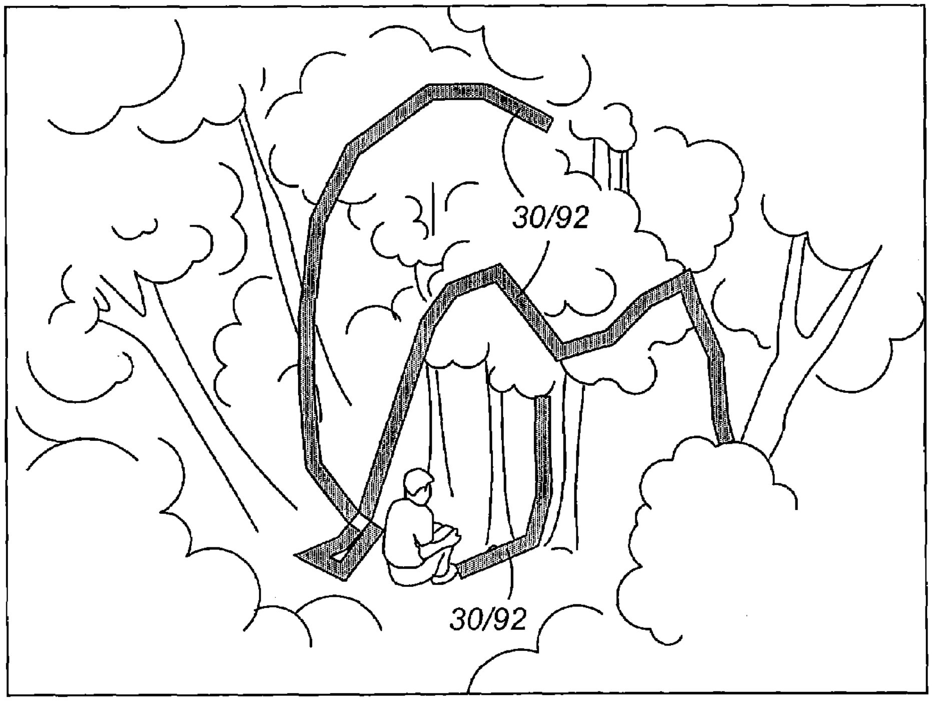
FIG. 16 illustrates selected lengths of reflective strands that have been deployed by a user.

As shown in FIG. 16, a user has placed the reflective strand material in a desired orientation around vegetation where the user is located. As discussed above, the reflective nature of the strand material is highly effective for overhead visual observation.

There are many clear advantages to the device and method of the present invention as more fully set forth above. A simple, yet effective device provides visual identification of a person to be rescued, and also provides rescuers of avalanche victims a physical connection to the exact location of the victim thereby speeding rescue efforts.

While the foregoing invention has been disclosed with reference to various preferred embodiments, it shall be understood that various changes and modifications to the invention can be made within the spirit and scope of the present invention, in accordance with the scope of the claims appended hereto.

What is claimed is:

1. An emergency rescue device comprising:

a canister having an interior sidewall;

a lid covering said canister;

a plurality of reflective strands secured in said canister;

a propellant placed in said canister adjacent said reflective strands;

a base placed in said canister along said interior sidewall, separated from said propellant, and proximal ends of said reflective strands connected to said base; and an activation element communicating with said propellant wherein activation of said activation element causes said propellant to create an over-pressure environment inside the canister and to eject distal ends of the reflective strands away from said canister while said base and said proximal ends of said reflective strands remain secured to said canister.

2. A device, as claimed in claim 1, wherein:

said propellant is a liquid or gaseous fuel that combusts upon activation.

3. A device, as claimed in claim 1, wherein:

said propellant is an explosive charge.

4. A device, as claimed in claim 1, wherein:

said propellant is a compressed gas that is released in said canister.

5. A device, as claimed in claim 4, wherein:

said compressed gas is released from a cylinder in said canister by activation of said activation element.

6. A device, as claimed in claim 1, wherein:

said strands are made of nylon or MYLAR®.

7. A device, as claimed in claim 1, wherein:

said strands are made from a combination of nylon and MYLAR®.

8. An emergency rescue device comprising:

a canister;

a lid covering said canister;

a base material placed in said canister;

a plurality of reflective strands placed in said canister and having proximal ends secured to said base material;

a plurality of compressed springs placed in said canister and having proximal ends connected to distal ends of said reflective strands, said springs having free distal ends;

a lid lock for locking said lid over said canister; and an activation element for unlocking said lid lock, thereby enabling said springs to decompress and eject said strands away from said canister and said proximal ends of said reflective strands remaining attached to said base material.

9. A device, as claimed in claim 8, wherein:

said activation element includes a pull ring and cord connected to said lid lock.

10. A method of providing a visually perceptible rescue device connected to a user to be rescued, said method comprising the steps of:

providing an emergency rescue device comprising:

(i) a canister;

(ii) a lid covering said canister;

(iii) a plurality of reflective strands mounted in said canister, said strands having proximal ends secured to said canister;

(iv) a propellant placed in said canister adjacent said reflective strands; and (v) a base placed in said canister along an interior sidewall, separated from said propellant, and proximal ends of said reflective strands connected to said base (vi) an activation element communicating with said propellant; and activating the activation element causing the propellant to create an over-pressure environment inside the canister and to eject the plurality of reflective strands in a multi-directional pattern away from the canister and said proximal ends remaining attached to said canister.

11. A method of rescuing an avalanche victim, said method comprising the steps of:

providing an emergency rescue device attached to the victim, comprising;

(i) a canister;

(ii) a lid covering said canister;

(iii) a plurality of reflective strands mounted in said canister, said strands having proximal ends secured to said canister;

(iv) a propellant placed in said canister adjacent said reflective strands; and (v) a base placed in said canister along an interior sidewall, separated from said propellant, and proximal ends of said reflective strands connected to said base (vi) an activation element communicating with said propellant; and activating the activation element causing the propellant to eject the plurality of reflective strands in a multi-directional pattern away from the canister, said proximal ends remaining attached to said canister;

observing the avalanche area and seeing at least one reflective strand thereby designating the general location of the avalanche victim;

grasping the strand; and pulling vigorously on the strand thereby straightening the strand along a portion thereof and observing a direction of travel of the strand in order to ascertain a more precise location of the victim.

12. A method, as claimed in claim 11, wherein:

said propellant is a liquid or gaseous fuel that combusts upon activation.

13. A method, as claimed in claim 11, wherein:

said propellant is an explosive charge.

14. A method, as claimed in claim 11, wherein:

said propellant is a compressed gas that is released in said canister.

* * * * *